United States Patent
Nakagawa

(10) Patent No.: US 7,942,178 B2
(45) Date of Patent: May 17, 2011

(54) PNEUMATIC TIRE FOR MOTORCYCLE HAVING CENTRAL, INTERMEDIATE AND SHOULDER TREAD RUBBER

(75) Inventor: Hidemitsu Nakagawa, Saitama (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 12/664,370

(22) PCT Filed: May 20, 2008

(86) PCT No.: PCT/JP2008/059240
§ 371 (c)(1),
(2), (4) Date: Jan. 27, 2010

(87) PCT Pub. No.: WO2008/152886
PCT Pub. Date: Dec. 18, 2008

(65) Prior Publication Data
US 2010/0175800 A1 Jul. 15, 2010

(30) Foreign Application Priority Data
Jun. 13, 2007 (JP) ................................. 2007-156308

(51) Int. Cl.
*B60C 1/00* (2006.01)
*B60C 11/00* (2006.01)
(52) U.S. Cl. ................................ 152/209.5; 152/209.11
(58) Field of Classification Search ............... 152/209.5, 152/209.11
See application file for complete search history.

(56) References Cited

U.S. PATENT DOCUMENTS

| | | | | |
|---|---|---|---|---|
| 4,407,346 A | * | 10/1983 | Bandel et al. | 152/209.5 |
| 5,373,886 A | * | 12/1994 | Yamaguchi et al. | 152/526 |
| 6,619,355 B1 | * | 9/2003 | Niizato | 152/523 |
| 2003/0000616 A1 | * | 1/2003 | Watkins et al. | 152/209.5 |
| 2006/0102266 A1 | * | 5/2006 | Ravasio et al. | 152/209.5 |
| 2006/0207701 A1 | | 9/2006 | Tanaka | |
| 2007/0137747 A1 | * | 6/2007 | Yoshida | 152/209.5 |
| 2009/0173420 A1 | * | 7/2009 | Katayama et al. | 152/209.5 |

(Continued)

FOREIGN PATENT DOCUMENTS

EP 1 950 059 A1 7/2008

(Continued)

OTHER PUBLICATIONS

Machine translation for Japan 2005-022622 (no date).*

(Continued)

*Primary Examiner* — Steven D Maki
(74) *Attorney, Agent, or Firm* — Sughrue Mion, PLLC

(57) ABSTRACT

The present invention provides a pneumatic tire for a motorcycle which improves driving performance and braking performance without degrading driving stability particularly when a middle camber angle is applied to the tire. This tire comprises a tread portion 1, side wall portions 2 and bead portions 3, wherein this tread portion 1 comprises five regions of a central region A, shoulder regions C and intermediate regions B and 100% modulus of at least a portion forming the ground contact surface of intermediate tread rubber 7b disposed over the entire region of the intermediate regions B is larger than both of 100% modulus of at least a portion forming the ground contact surface of central tread rubber 7a disposed over the entire region of the central region A and 100% modulus of at least a portion forming the ground contact surface of shoulder tread rubber 7c disposed over the entire region of the shoulder regions C.

4 Claims, 1 Drawing Sheet

U.S. PATENT DOCUMENTS

| | | | |
|---|---|---|---|
| 2010/0024938 A1* | 2/2010 | Ishiyama | 152/209.5 |
| 2010/0163145 A1* | 7/2010 | Nakagawa | 152/209.5 |
| 2010/0175800 A1* | 7/2010 | Nakagawa | 152/209.5 |
| 2010/0180996 A1* | 7/2010 | Nakagawa | 152/209.5 |
| 2010/0193095 A1* | 8/2010 | Nakagawa | 152/209.5 |

FOREIGN PATENT DOCUMENTS

| | | | |
|---|---|---|---|
| JP | 05-201207 | * | 8/1993 |
| JP | 07-195906 | * | 8/1995 |
| JP | 10-119513 A | | 5/1998 |
| JP | 2000-158910 | * | 6/2000 |
| JP | 2000-158910 A | | 6/2000 |
| JP | 2004-351956 A | | 12/2004 |
| JP | 2005-022622 | * | 1/2005 |
| JP | 2006-256385 A | | 9/2006 |
| JP | 2006-273240 A | | 10/2006 |
| WO | 2007/055322 | * | 5/2007 |
| WO | 2007/055322 A1 | | 5/2007 |

OTHER PUBLICATIONS

Machine translation for Japan 2000-158910 (no date).*
Machine translation for Japan 07-195906 (no date).*
Machine translation for Japan 05-201207 (no date).*
International Search Report PCT/JP2008/059240, Sep. 2, 2008.

* cited by examiner

PNEUMATIC TIRE FOR MOTORCYCLE HAVING CENTRAL, INTERMEDIATE AND SHOULDER TREAD RUBBER

CROSS REFERENCE TO RELATED APPLICATIONS

This application is a National Stage of International Application No. PCT/JP2008/059240 filed May 20, 2008, claiming priority based Japanese Patent Application No. 2007-156308, filed Jun. 13, 2007, the contents of all of which are incorporated herein by reference in their entirety.

TECHNICAL FIELD

The present invention relates to a pneumatic tire for a motorcycle.

RELATED ART

In order for a motorcycle to run in a corner, a camber angle should be applied to a tire for the motorcycle, by which the tire is tilted with respect to a road surface in contrast to a tire for a so-called four-wheel vehicle such as a passenger car, a bus and a truck, which runs in a corner with a slip angle being applied to the tire. Therefore, in a tire for a motorcycle a ground contact region of a tread portion in straight running will be different from that in cornering. That is to say, a central region including a tire equatorial plane of a tread portion contacts a road surface in straight running to function to transmit a driving force and a braking force to the road surface while a shoulder region including a tread ground contact end contacts a road surface in cornering to function to generate a lateral force against a centrifugal force applied to the motorcycle. An intermediate region located between these regions functions to transmit a driving force and a braking force to a road surface for example in the end of a corner and generates a lateral force against a centrifugal force in cornering.

Therefore, if tread rubber disposed in a ground contact region of a tread portion of a tire for a motorcycle comprises a single kind of rubber or has a single kind of rubber hardness and the like, it is impossible to sufficiently achieve the above-mentioned functions in each of the ground contact regions.

For example, JP2006-273240 describes a pneumatic tire for a motorcycle aiming to improve high-speed durability in straight running by a central region as well as grip performance and stability in cornering by shoulder regions by dividing a ground contact region of a tread portion into three regions of a central region and shoulder regions and by disposing tread rubber in each region which comprises rubber material having a suitable ratio for dynamic elasticity of loss tangent.

However, although the pneumatic tire for a motorcycle described in JP2006-273240 can attain improvement of high-speed durability by a central region as well as improvement of grip performance and stability in cornering by shoulder regions, not only a driving force and a braking force are still insufficiently transmitted to a road surface but also a lateral force against a centrifugal force is still insufficiently generated, which are required for an intermediate region contacting a road surface especially in the end of a corner in cornering and spreading both of the central and shoulder regions. In addition, in this pneumatic tire for a motorcycle uneven wear is easily generated in the vicinity of the intermediate region particularly by running in a corner.

In addition, if, for example, two kinds of tread rubber having greatly different ratio for dynamic elasticity of loss tangent are used in the center and shoulder regions, when a camber angle is increased or decreased, different kinds of rubber simultaneously or sequentially contact the ground, which results in great change of ground contact performance of the tread rubber with the change of the camber angle so that driving stability is likely to become insufficient.

DISCLOSURE OF THE INVENTION

Problems to be Solved by the Invention

Therefore, the present invention provides a pneumatic tire for a motorcycle which improves driving performance and braking performance without degrading driving stability particularly when a middle camber angle is applied to the tire.

Means for Solving the Problem

A pneumatic tire for a motorcycle according to the present invention comprises a tread portion comprising tread rubber having a layered structure of one or more layers, a pair of side wall portions extending continuously from each side of this tread portion inward in a radial direction of the tire and bead portions each continuing into an radially inner side of each of these side wall portions, wherein a ground contact region of the tread portion comprises five regions of: a central region including a tire equatorial plane; a pair of shoulder regions each including a tread ground contact end and a pair of intermediate regions each located between the central region; and each of the shoulder regions, and 100% modulus of at least a portion forming a ground contact surface of intermediate tread rubber disposed over an entire region of the intermediate regions is larger than both of 100% modulus of at least a portion forming a ground contact surface of central tread rubber disposed over an entire region of the central region and 100% modulus of at least a portion forming a ground contact surface of shoulder tread rubber disposed over an entire region of the shoulder regions. The term "tread rubber having a layered structure of one or more layers" as used herein includes not only tread rubber of the tread portion comprising a single layer but also tread rubber comprising multiple layers such as a cap and base structure.

100% modulus as used herein means a value obtained by measuring tensile stress in a tensile test with JIS dumbbell shaped test piece no. 3 in accordance with JISK6251 at room temperature at a speed of 500±25 mm/min.

In this pneumatic tire for a motorcycle 100% modulus of the central tread rubber is preferably larger than 100% modulus of the shoulder tread rubber.

In addition, 100% modulus of the intermediate tread rubber is preferably within a range between 1.3 MPa and 2.1 MPa.

It is more preferable that 100% modulus of the central tread rubber is within a range between 1.0 MPa and 1.8 MPa and that 100% modulus of the shoulder tread rubber is within a range between 0.9 MPa and 1.7 MPa.

In addition, it is more preferable that a periphery length of an outer surface of the intermediate tread rubber is within a range between 10% and 40% of a periphery length of an entire of the ground contact region in a cross-sectional view taken along a tire meridian. The periphery length as used herein means a length measured along the tread surface when a tire is mounted on an application rim specified by the standards of JATMA YEAR BOOK, ETRTO STANDARD MANUAL, TRA (THE TIRE and RIM ASSOCIATION INC.) YEAR BOOK and applied with an internal pressure regulated also in JATMA YEAR BOOK, ETRTO STANDARD MANUAL, TRA (THE TIRE and RIM ASSOCIATION INC.) YEAR BOOK or the like.

It is more preferable that a periphery length of an outer surface of the central tread rubber is within a range between 10% and 35% of a periphery length of an entire of the ground contact region and a periphery length of an outer surface of the shoulder tread rubber is within a range between 5% and 35% of the periphery length of the entire of the ground contact region in a cross-sectional view taken along a tire meridian.

In any one of the above-mentioned tires the side wall portion preferably has a mark indicating that the tire is for a rear wheel of a motorcycle.

Effect of the Invention

In a pneumatic tire for a motorcycle the central region contacting the ground in straight running needs property suitable for efficiently transmitting a driving force and a braking force to a road surface and the shoulder region contacting the ground in cornering needs property suitable for generating a sufficient lateral force. In addition, the intermediate region of the tread portion located between both of those regions needs property not only for efficiently transmitting a driving force and a braking force to a road surface in the end of a corner or the like but also for generating a sufficient lateral force.

Therefore, in the pneumatic tire for a motorcycle of the present invention, attention is focused on modulus of the tread rubber as measurement of stiffness to elongation of the tread portion by an external force. 100% modulus at 100% elongation when data are comparatively stable is used as a measure of magnitude of this modulus.

By setting 100% modulus of at least a portion forming a ground contact surface of intermediate tread rubber being larger than both of 100% modulus of at least a portion forming a ground contact surface of central tread rubber and 100% modulus of at least a portion forming a ground contact surface of shoulder tread rubber, the intermediate region contacting the ground especially in the end of a corner or the like where a middle camber angle is applied to a tire secures high stiffness so as to increase forward and backward stiffness and lateral stiffness. Therefore, the intermediate region can achieve high driving performance and braking performance as well as sufficient lateral force against a centrifugal force.

DESCRIPTION OF REFERENCE NUMERALS

Figure 1:
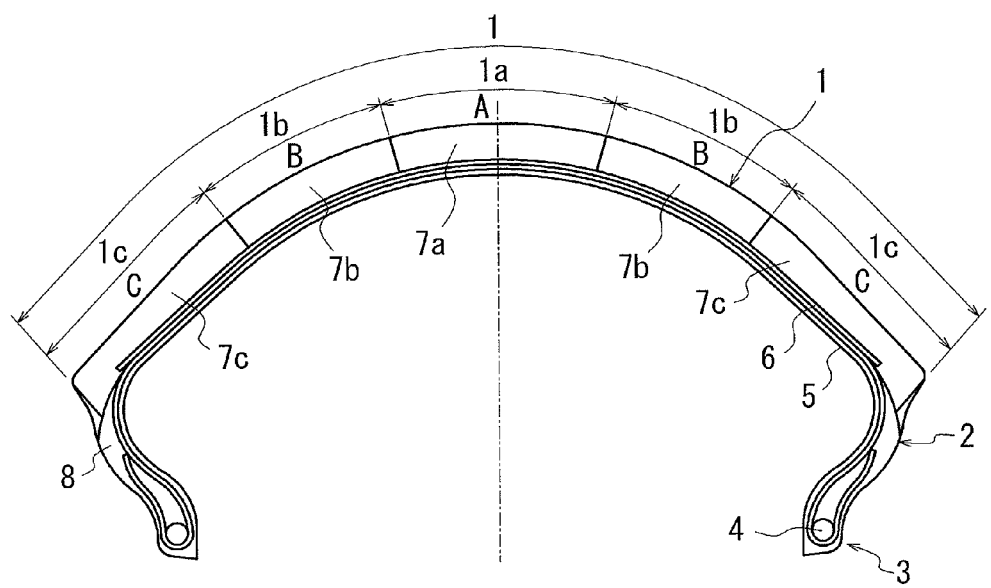
FIG. 1 is a widthwise sectional view showing an embodiment of a pneumatic tire for a motorcycle according to the present invention.

| | |
|---|---|
| 1 | tread portion |
| 2 | side wall portion |
| 3 | bead portion |
| 4 | bead core |
| 5 | carcass ply |
| 6 | belt |
| 7 | tread rubber |
| 7a | central tread rubber |
| 7b | intermediate tread rubber |
| 7c | shoulder tread rubber |
| 8 | side rubber |

-continued

DESCRIPTION OF REFERENCE NUMERALS

| | |
|---|---|
| A | central region |
| B | intermediate region |
| C | shoulder region |

BEST MODE FOR CARRYING OUT THE INVENTION

Hereinafter, a pneumatic tire for a motorcycle of the present invention will be described in detail with reference to drawings. FIG. 1 is a cross-sectional view taken along a meridian showing an embodiment of a pneumatic tire for a motorcycle according to the present invention.

In FIG. 1, the reference numeral 1 denotes a tread portion, the reference numeral 2 denotes a pair of side wall portions continuously extending from each side of the tread portion 1 inward in the radial direction and the reference numeral 3 denotes bead portions each continuing into a radially inner side of each of the side wall portions 2.

The tire has a carcass ply 5 extending from the tread portion 1 through the side wall portions 2 and turned around bead cores 4 of the bead portions 3. Although a carcass consists of one carcass ply 5 in the figure, a carcass may consist of a plurality of carcass plies.

A belt 6 consisting of at least a circumferential reinforcing cord layer is disposed on the outer circumferential side of the carcass ply 5 in the crown region. This belt 6 may have a so-called spiral belt structure in such a manner that, for example, one or plural cords extending in the tire circumferential direction are continuously wound. Tread rubber 7 extending between tire maximum width positions in an arc and forming a ground contact region of the tread portion 1 is provided on the further outer circumferential side of the belt 6. Side rubber 8 forming a side portion is provided in each side of the tread rubber 7.

In addition, predetermined grooves are formed on the surface of the tread rubber 7 though they are omitted in FIG. 1.

In the tire shown in the figure, the ground contact region of the tread portion 1 comprises five regions of a central region A including a tire equatorial plane, shoulder regions C each including a tread ground contact end and intermediate regions B each located between the central region A and each of the shoulder regions C. The shoulder regions C and the intermediate regions B respectively form a pair in symmetrical positions with respect to the equatorial plane.

The tread rubber 7 disposed in each region has a single layered structure. 100% modulus of at least a portion forming a ground contact surface of intermediate tread rubber 7b disposed over the entire region of the intermediate regions B is larger than both of 100% modulus of at least a portion forming a ground contact surface of central tread rubber 7a disposed over the entire region of the central region A and 100% modulus of at least a portion forming a ground contact surface of shoulder tread rubber 7c disposed over the entire region of the shoulder regions C. 100% modulus of the central tread rubber 7a is preferably larger than 100% modulus of the shoulder tread rubber 7c.

In a tire for a motorcycle, the central region A of the tread portion 1 of the tire mainly contacts the ground in straight running while the shoulder region C comes to contact the ground by shifting the ground contact region of the tire from the central region A of the tread portion 1 during running in a corner with a camber angle being applied. Since the frequency of straight running is much more than that of running in a corner, it is possible to obtain a tire superior both in abrasion resistance and cornering performance by disposing rubber with emphasis on abrasion resistance in the central region A and disposing rubber with emphasis on a gripping power in the shoulder regions C. As a result, it is possible to increase stiffness of a tire and to improve abrasion resistance.

Therefore, in this pneumatic tire for a motorcycle, the intermediate region B contacting the ground for example in the end of a corner where a middle camber angle is applied to the tire can secure high stiffness so as to increase forward and backward stiffness and lateral stiffness. As a result, the intermediate region B can achieve high driving performance and braking performance as well as a sufficient lateral force against a centrifugal force.

By setting 100% modulus of the intermediate tread rubber 7b being within a range between 1.3 MPa and 2.1 MPa, it is possible to obtain sufficient stiffness for each of a high driving force, a braking force and a lateral force.

When 100% modulus of the intermediate tread rubber 7b is less than 1.3 MPa, it is likely that sufficient driving force and lateral force cannot be secured due to lack of stiffness. On the other hand, when it is more than 2.1 MPa, it is likely that absorption performance of vibration by irregularities of a road surface and ground contact performance may deteriorate due to excessively high stiffness.

By setting 100% modulus of the central tread rubber 7a being within a range between 1.0 MPa and 1.8 MPa and 100% modulus of the shoulder tread rubber 7c being within a range between 0.9 MPa and 1.7 MPa, it is possible to obtain superior performance both in abrasion resistance and cornering performance.

When 100% modulus of the central tread rubber 7a is less than 1.0 MPa, it is likely that abrasion resistance may deteriorate due to lack of stiffness. On the other hand, when it is more than 1.8 MPa, it is likely that absorption performance of irregularities of a road surface may deteriorate due to excessively high stiffness.

When 100% modulus of the shoulder tread rubber 7c is less than 0.9 MPa, it is likely that sufficient stiffness with respect to a lateral force cannot be secured due to lack of stiffness. On the other hand, when it is more than 1.7 MPa, it is likely that absorption performance of irregularities of a road surface may deteriorate in cornering.

The periphery length 1b of the outer surface of the intermediate tread rubber 7b is more preferably within a range between 10% and 40% of the periphery length 1 of the entire of the ground contact region in a cross-sectional view taken along the tire meridian.

By setting the periphery length 1b of the outer surface of the intermediate tread rubber 7b being within a range between 10% and 40% of the periphery length 1 of the entire of the ground contact region in a cross-sectional view taken along the tire meridian, high forward and backward stiffness and lateral stiffness can be secured and high driving performance, braking performance and cornering performance can be respectively achieved.

When the periphery length 1b of the outer surface of the intermediate tread rubber 7b is less than 10% of the periphery length 1 of the entire of the ground contact region, it is likely that sufficient stiffness with respect to a driving force, a braking force and a lateral force cannot be secured. On the other hand, when is it more than 40%, the intermediate tread rubber 7b having high 100% modulus widely spreads into the central region A or the shoulder regions C. Then, each portion increases its stiffness more than required and it is likely that absorption performance of irregularities of a road surface may deteriorate.

The periphery length 1a of the outer surface of the central tread rubber 7a is preferably within a range between 10% and 35% of the periphery length 1 of the entire of the ground contact region and the periphery length 1c of the outer surface of the shoulder tread 7c rubber is preferably within a range between 5% and 35% of the periphery length 1 of the entire of the ground contact region in a cross-sectional view taken along the tire meridian.

By setting the periphery length 1a of the outer surface of the central tread rubber 7a being within a range between 10% and 35% of the periphery length I of the entire of the ground contact region and the periphery length 1c of the outer surface of the shoulder tread 7c rubber being within a range between 5% and 35% of the periphery length 1 of the entire of the ground contact region in a cross-sectional view taken along the tire meridian, it is possible to respectively adapt absorption performance and driving performance both in straight running and in cornering and cornering performance.

When the periphery length 1a of the outer surface of the central tread rubber 7a is less than the periphery length 1 of the entire of the ground contact region, it is likely that the intermediate tread rubber 7b having high stiffness enters into ground contact region in straight running so that stiffness of the ground contact region in straight running becomes higher than required, which will lead to deterioration of ride comfort. On the other hand, when it is more than 35%, it is likely that the effect of improvement in driving performance with the increase in stiffness of the intermediate region B may be small.

When the periphery length 1c of the outer surface of the shoulder tread rubber 7c is less than 5% of the periphery length 1 of the entire of the ground contact region, it is likely that the intermediate tread rubber 7b having high stiffness largely enters into the ground contact region in cornering so that stiffness of the ground contact region becomes higher than required and absorption performance of irregularities of a road surface and ground contact performance may deteriorate in cornering. On the other hand, when it is more than 35%, it is likely that the effect of improvement in driving performance with the increase in stiffness of the intermediate region B may be small.

Since a rear wheel is a drive wheel in a motorcycle, the present invention exerts great effect when applied in a tire for a rear wheel. Therefore, the side wall portion 2 preferably has a mark indicating that the tire is for a rear wheel of a motorcycle.

Example 1

Figure 2:
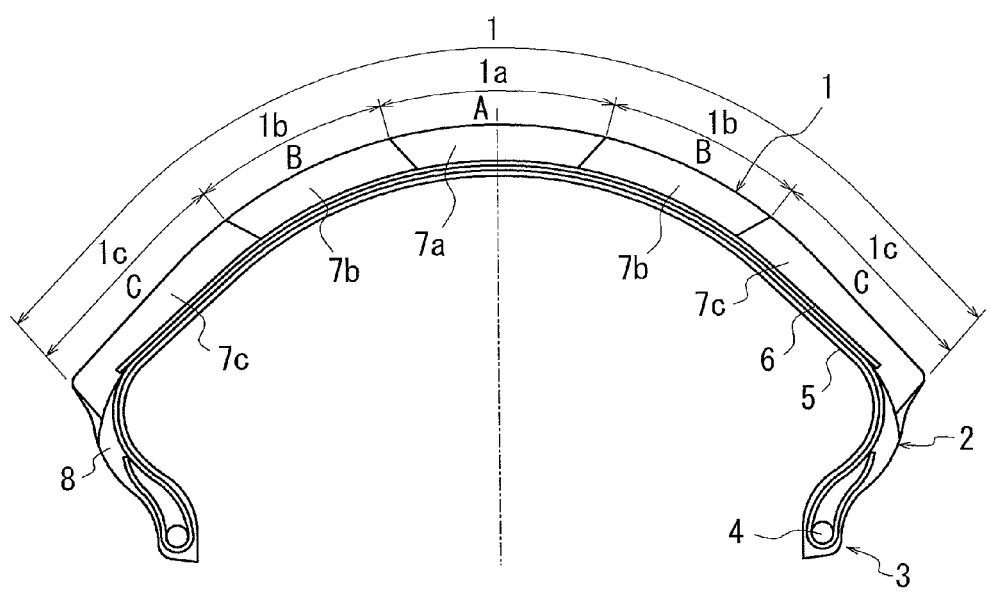
FIG. 2 is a widthwise sectional view showing another embodiment of a pneumatic tire for a motorcycle according to the present invention.

Next, tires for rear wheels are experimentally produced, each of the tires has the structure shown in FIG. 2 with the size of 190/50ZR17 and comprises a monofilament spiral belt and a nylon belt. As shown in Tables 1 and 2, Example tires 1 to 7 and Comparative Example tires 1 and 2, in which respective parameters are changed, are evaluated for their driving performance. In the experiment a tire for a front wheel is a radial tire with the size of 120/70ZR17. The tire of the present invention has the substantially similar structure to that of a conventional pneumatic tire for a motorcycle since the tire structure except for the tread portion need not to be changed.

TABLE 1

|  | Central tread rubber periphery length 1a [%] | Intermediate tread rubber periphery length 1b [%] | Shoulder tread rubber periphery length 1c [%] |
|---|---|---|---|
| Example tire 1 | 22 | 56 | 22 |
| Example tire 2 | 22 | 60 | 18 |
| Example tire 3 | 15 | 60 | 25 |
| Example tire 4 | 5 | 73 | 22 |
| Example tire 5 | 22 | 56 | 22 |
| Example tire 6 | 22 | 33 | 45 |
| Example tire 7 | 22 | 56 | 22 |
| Comparative Example tire 1 | 100 | 0 | 0 |
| Comparative Example tire 2 | 22 | 56 | 22 |

TABLE 2

|  | Central tread rubber 100% modulus [MPa] | Intermediate tread rubber 100% modulus [MPa] | Shoulder tread rubber 100% modulus [MPa] |
|---|---|---|---|
| Example tire 1 | 1.38 | 1.68 | 1.28 |
| Example tire 2 | 1.38 | 1.68 | 1.28 |
| Example tire 3 | 1.38 | 1.68 | 1.28 |
| Example tire 4 | 1.38 | 1.68 | 1.28 |
| Example tire 5 | 1.28 | 1.68 | 1.38 |
| Example tire 6 | 1.38 | 1.68 | 1.28 |
| Example tire 7 | 1.38 | 1.58 | 1.28 |
| Comparative Example tire 1 | 1.38 | 1.38 | 1.38 |
| Comparative Example tire 2 | 1.68 | 1.38 | 1.28 |

(Driving Performance)

Each of Example tires 1 to 7 and Comparative Example tires 1 and 2 is mounted on a rim having the size of MT6.00 and applied with the internal pressure of 290 kPa and the load of 150 kg and then repeatedly travelling at a speed of 30 to 300 km/h with the travel distance of 4 km with the camber angle of 0 to 45 degrees. Results of driving performance evaluated by an evaluation rider based on his feelings are shown in Table 3. Results are shown in index values with the value of Comparative Example tire 1 being defined as 100. The larger value indicates the better result.

TABLE 3

|  | Driving Performance |
|---|---|
| Example Tire 1 | 120 |
| Example tire 2 | 125 |
| Example tire 3 | 120 |
| Example tire 4 | 110 |
| Example tire 5 | 110 |
| Example tire 6 | 101 |
| Example tire 7 | 115 |
| Comparative Example tire 1 | 100 |
| Comparative Example tire 2 | 95 |

The results of Table 3 show that Comparative Example tires 1 and 2 do not exert sufficient driving performance in comparison to those of Example tires 1 to 7.

Example 2

Each of Example tires 1 to 7 and Comparative Example tires 1 and 2 is evaluated for its absorption performance of vibration by irregularities of a road surface as described below.

(Absorption Performance)

Under the condition of the load of 150 kg, the travel distance of 4 km and the camber angle of 0 to 45 degrees at a speed of 30 to 300 km/h, the magnitude and the start point of vibration amplitude by irregularities of a road surface are evaluated by an evaluation rider based on his feelings and their results are shown in Table 4. Results are shown in index values with the value of Comparative Example tire 1 being defined as 100. The larger value indicates the better absorption performance.

TABLE 4

|  | Absorption Performance |
|---|---|
| Example Tire 1 | 115 |
| Example tire 2 | 110 |
| Example tire 3 | 120 |
| Example tire 4 | 102 |
| Example tire 5 | 100 |
| Example tire 6 | 105 |
| Example tire 7 | 104 |
| Comparative Example tire 1 | 100 |
| Comparative Example tire 2 | 90 |

The results of Table 4 show that Comparative Example tires 1 and 2 do not exert sufficient absorption performance in comparison to those of Example tires 1 to 7.

Example 3

Each of Example tires 1 to 7 and Comparative Example tires 1 and 2 is evaluated for its abrasion resistance as described below.

(Abrasion Resistance)

An actual car with each of the experimental tires repeatedly runs under the condition of the load of 150 kg, the travel distance of 4 km and the camber angle of 0 to 45 degrees at a speed of 100 to 300 km/h. Then, by measuring the groove depth of the abraded tire, each tire is evaluated for abrasion resistance as shown in Table 5. Results are shown in index values with the value of Comparative Example tire 1 being defined as 100. The larger value indicates the better abrasion resistance.

TABLE 5

|  | Abrasion resistance |
|---|---|
| Example Tire 1 | 100 |
| Example tire 2 | 100 |
| Example tire 3 | 100 |
| Example tire 4 | 102 |
| Example tire 5 | 100 |
| Example tire 6 | 100 |
| Example tire 7 | 100 |
| Comparative Example tire 1 | 100 |
| Comparative Example tire 2 | 105 |

The results of Table 5 show that Example tires 1 to 7 can improve driving performance and braking performance with maintaining without deteriorating abrasion resistance.

The results of Tables 3 to 5 show that Example tires 1 to 7 are superior in driving performance and absorption performance to Comparative Example tires 1 and 2.

The invention claimed is:

1. A pneumatic tire for a motorcycle comprising
a tread portion comprising tread rubber having a layered structure of one or more layers,
a pair of side wall portions continuously extending from each side of this tread portion inward in a radial direction of the tire and
bead portions each continuing into a radially inner side of each of these side wall portions, wherein a ground contact region of the tread portion comprises five regions of:
   a central region including a tire equatorial plane;
   a pair of shoulder regions each including a tread ground contact end; and
   a pair of intermediate regions each located between the central region and each of the shoulder regions,
100% modulus of at least a portion forming a ground contact surface of intermediate tread rubber disposed over an entire region of the intermediate regions is larger than both of 100% modulus of at least a portion forming a ground contact surface of central tread rubber disposed over an entire region of the central region and 100% modulus of at least a portion forming a ground contact surface of shoulder tread rubber disposed over an entire region of the shoulder regions;
100% modulus of the intermediate tread rubber is within a range between 1.3 MPa and 2.1 MPa; and
in a half of a cross-sectional view taken along a tire meridian, a periphery length of an outer surface of the intermediate tread rubber is within a range between 10% and 40% of a periphery length of an entire of the ground contact region;
wherein 100% modulus of the central tread rubber is larger than 100% modulus of the shoulder tread rubber.

2. The pneumatic tire for a motorcycle according to claim 1, wherein 100% modulus of the central tread rubber is within a range between 1.0 MPa and 1.8 MPa and 100% modulus of the shoulder tread rubber is within a range between 0.9 MPa and 1.7 MPa.

3. The pneumatic tire for a motorcycle according to claim 1, wherein, in a cross-sectional view taken along a tire meridian, a periphery length of an outer surface of the central tread rubber is within a range between 10% and 35% of a periphery length of an entire of the ground contact region and, in a half of a cross-sectional view taken along a tire meridian, a periphery length of an outer surface of the shoulder tread rubber is within a range between 5% and 35% of the periphery length of the entire of the ground contact region.

4. The pneumatic tire for a motorcycle according to claim 1, wherein the side wall portion has a mark indicating that the tire is to be mounted on a rear wheel of a motorcycle.

* * * * *